United States Patent
Parsons et al.

(10) Patent No.: US 10,731,553 B2
(45) Date of Patent: Aug. 4, 2020

(54) ENGINE COMPARTMENT FLAMMABLE FLUID DRAINAGE SYSTEM

(71) Applicant: Bell Helicopter Textron Inc., Fort Worth, TX (US)

(72) Inventors: Thomas Dewey Parsons, Fort Worth, TX (US); Chris James Ludtke, Grapevine, TX (US); Andrew Jordan Birkenheuer, Arlington, TX (US); Eric Christopher Terry, Fort Worth, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 129 days.

(21) Appl. No.: 15/673,762

(22) Filed: Aug. 10, 2017

(65) Prior Publication Data

US 2019/0048795 A1 Feb. 14, 2019

(51) Int. Cl.

| | |
|---|---|
| *F02B 77/10* | (2006.01) |
| *A62C 3/08* | (2006.01) |
| *F02B 77/04* | (2006.01) |
| *F01P 1/06* | (2006.01) |
| *F01P 11/12* | (2006.01) |
| *F16N 31/00* | (2006.01) |
| *F01P 1/00* | (2006.01) |
| *A62C 2/06* | (2006.01) |
| *B64D 45/00* | (2006.01) |

(52) U.S. Cl.
CPC ............... *F02B 77/10* (2013.01); *A62C 3/08* (2013.01); *F01P 1/06* (2013.01); *F01P 11/12* (2013.01); *F02B 77/04* (2013.01); *F16N 31/00* (2013.01); *A62C 2/06* (2013.01); *B64D 45/00* (2013.01); *B64D 2045/009* (2013.01); *F01P 2001/005* (2013.01)

(58) Field of Classification Search
CPC ... F02B 77/10; F02B 77/04; B63J 2/06; F01P 1/06; F01P 11/12; F16N 31/00; B64D 45/00; B64D 2045/009; A62C 3/08; A62C 4/00; A62C 2/06
See application file for complete search history.

(56) References Cited

U.S. PATENT DOCUMENTS

| | | | | |
|---|---|---|---|---|
| 2011/0215077 A1* | 9/2011 | Smiles | ...................... | H05B 1/00 219/201 |
| 2014/0319273 A1* | 10/2014 | Rod | ........................ | A62C 3/00 244/114 R |
| 2015/0197346 A1* | 7/2015 | Jullie | ....................... | A62C 3/08 244/129.2 |

OTHER PUBLICATIONS

Applicant's Statement of Use of a Drain Pan in a V-22, 1 page.

* cited by examiner

*Primary Examiner* — Syed O Hasan
(74) *Attorney, Agent, or Firm* — Whitaker Chalk Swindle & Schwartz PLLC; Enrique Sanchez, Jr.

(57) ABSTRACT

The present invention achieves technical advantages as an engine compartment drainage system that allows fluid on an engine deck to exit an engine compartment, while shielding fluid from airflow. A fluid drainage apparatus utilizes a funnel member to direct fluid to an external drain line. A drain shield circumscribes the top end of the funnel member and upwardly extending therefrom and directs airflow away from the funnel member. A plurality of deck holes are disposed in the drain shield, such that fluid on the deck can enter the funnel member and exit the engine compartment. A fluid drainage system, disposes the fluid drainage apparatus in an engine deck to allow fluid on the deck to enter a funnel member of the apparatus and direct it toward the external drain line.

20 Claims, 7 Drawing Sheets

ENGINE COMPARTMENT FLAMMABLE FLUID DRAINAGE SYSTEM

BACKGROUND OF THE INVENTION

1. Field of the Invention

The present invention is generally related to fluid drainage systems, and more specifically to a fluid drainage system for isolating the fluid from airflow within an engine compartment.

2. Background of the Invention

During operation, the engine and engine compartment temperatures rise. Engine compartments typically require cooling to maintain the engine and other component temperatures below their respective operating temperature limits. Several temperature control mechanisms, such as cooling airflow, as well as coolant, oil, and other fluids have been utilized to maintain engine operation within acceptable operating temperature limits. Cooling inlets are typically located on the engine cowling to strategically direct cooling airflow throughout the engine compartment. An engine compartment inlet screen allows the cooling air to enter the engine compartment and scrub the hot engine to cool it. The fluids disposed within the engine can leak when engine component integrity degrades due to stress and normal wear. In the event of a fluid (fuel, oil, hydraulic fluid, etc. . . . ) leak inside the engine compartment, a mechanism to drain this fluid away from the engine compartment must be provided. Should the leaked fluid be flammable, a fire could ignite in the vehicle with catastrophic consequences.

A typical design practice is to insert drain holes on the floor of the engine deck to provide a path for the fluid to exit the aircraft through an external drain line connected to the drain holes. However, if the cooling inlet is located near a deck drain hole, significant airflow can scrub the deck drain hole, thereby redirecting the fluid away from the drain hole and prevent proper drainage. Worse, the airflow can direct the fluid along the airflow path through the air flow inlet screen and cause the potentially-flammable fluid to scrub the engine and other hot surfaces, causing a fire hazard. The airflow can also cause the fluid to miss the drain holes, allowing the fluid to flow along the engine deck. Should a fire start in the engine compartment, the fluid on the engine deck could provide additional fuel to the fire, exacerbating an already dangerous situation.

SUMMARY OF THE INVENTION

The present invention achieves technical advantages as an engine compartment drainage system that allows fluid on an engine deck of an engine compartment to exit the compartment, while shielding airborne fluid from airflow. One exemplary embodiment of the invention discloses a fluid drainage apparatus, having a funnel member adapted to receive fluid in the top end and direct the fluid to an external drain line through a drain hole at the bottom end. A drain shield circumscribes the top end of the funnel member and upwardly extending therefrom and directs airflow away from the funnel member. A plurality of deck holes are disposed in the drain shield, such that fluid on the deck can enter the funnel member and exit the engine compartment. A deck flange is disposed substantially around the drain shield, with the flange openings aligning with the bottom of the deck holes on the drain shield, so that fluid on the engine compartment deck can enter the funnel member via one or more deck holes unimpeded by the deck flange.

Another exemplary embodiment includes a fluid drainage system, having a cooling inlet adapted to direct cooling airflow throughout an engine compartment having an engine deck. An internal drain line drains excess fluid within an engine into the engine compartment and an external drain line directs fluids out of the engine compartment. A fluid drainage apparatus is disposed in the engine deck such that a funnel member of the apparatus is disposed in the engine deck and connected to the external drain line. The funnel member receives fluid and directs it toward the external drain line. A drain shield, coupled to the funnel member, upwardly extends from the funnel member to shield the drain line from the airflow from the cooling inlet such that the excess fluid is substantially directed toward the external drain line. A plurality of deck holes are disposed in the drain shield such that fluid on the engine deck can enter the funnel member and pass to the external drain line.

Other embodiments in accordance with the spirit and scope of the invention will become apparent to those of skill in the art.

DETAILED DESCRIPTION OF THE INVENTION

The preferred version of the invention presented in the following written description and the various features and advantageous details thereof are explained more fully with reference to the non-limiting examples included in the accompanying drawings and as detailed in the description which follows. Descriptions of well-known components and processes and manufacturing techniques are omitted so as to not unnecessarily obscure the principle features of the invention as described herein. The examples used in the description which follows are intended merely to facilitate an understanding of ways in which the invention may be practiced and to further enable those skilled in the art to practice the invention. Accordingly, the examples should not be construed as limiting the scope of the claimed invention.

Figure 1:
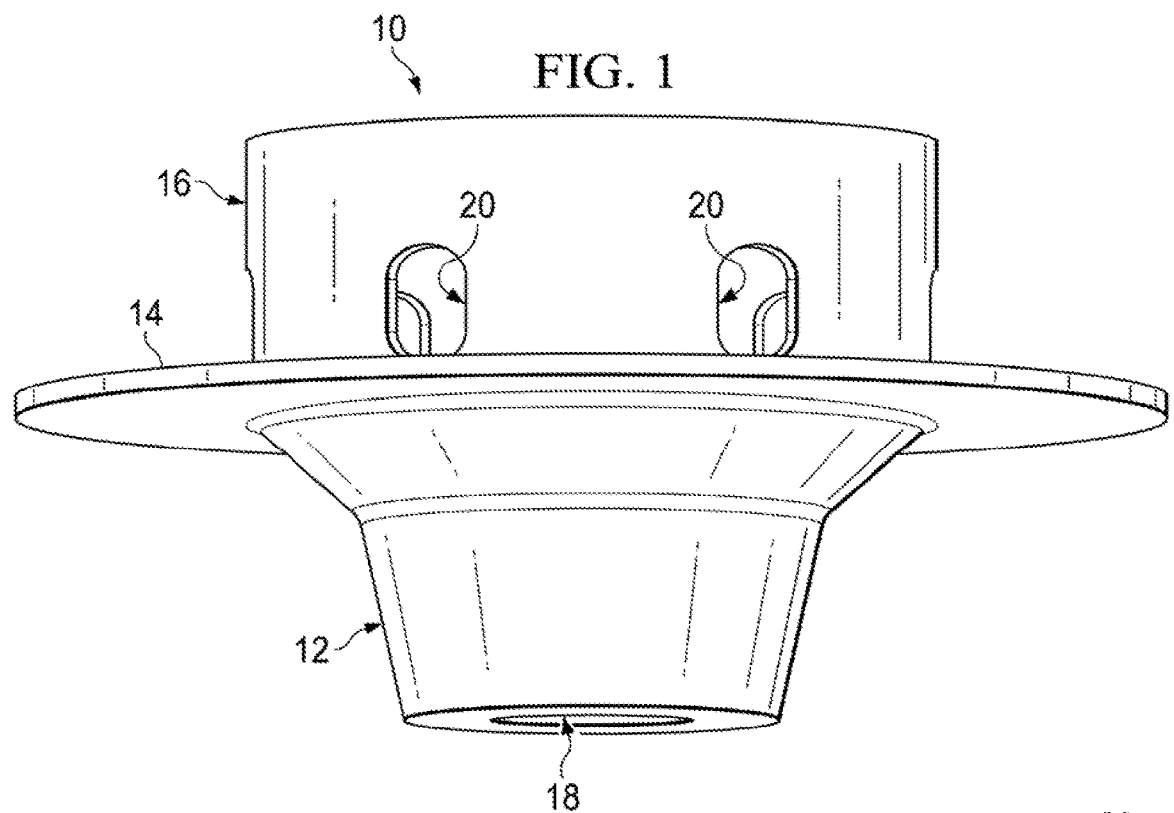
FIG. 1 is a perspective view of a fluid drainage apparatus, in accordance with an embodiment of the claimed invention.

FIG. 1 is a perspective view of a fluid drainage apparatus, designated generally as 10, in accordance with an embodiment of the claimed invention. The fluid drainage apparatus 10 allows fluid on an engine deck to exit an engine compartment, while shielding airborne fluid from airflow. The apparatus 10 includes a funnel member 12, a deck flange 14, and a drain shield 16. The apparatus 10 is preferably made of fireproof material.

The funnel member 12 has a top opening adapted to receive fluid and a bottom opening 18 adapted to direct the fluid to an external drain line. The top opening is larger than the bottom opening 18 such that the top opening can capture fluid from a larger area than the bottom opening. The bottom opening is sized to fit into a drain hole in the deck and operably engage an external drain line. The bottom opening 18 can contain a drain fitting to attach the apparatus 10 to the exterior drain line. The funnel member 12 is preferably made of a non-flammable material. The funnel member 12 can be made of metal, metal alloy, or other suitable material.

The deck flange 14 is disposed substantially around the top opening of the funnel member 12. The deck flange is sized to overhang the drain hole and provide a water-proof seal with the deck. In one embodiment, the deck flange 14 includes one or more flange openings such that any fluid on the deck can spill into the top opening of the funnel member 12 unimpeded by the deck flange 14. Without the flange openings, the height of the flange could prevent some or all of the liquid from entering the top opening of funnel member 12. The deck flange 14 is preferably disposed onto the engine deck with a sealant. The deck flange 14 is preferably made of a non-flammable material. The deck flange 14 can be made of metal, metal alloy, or other suitable material.

The drain shield 16 upwardly extends from the top opening of the funnel member. The drain shield 16 preferably circumscribes the top of the funnel member 12. In another embodiment, the drain shield 16 partially circumscribes the top opening of the funnel member 12. The partial circumscription of the opening of the funnel member 12 allows for greater fluid ingress into the funnel member 12, yet reduces the shielding of the airflow from a particular direction. The drain shield 16 shields the top opening of funnel member 12 from the cooling inlet airflow. The drain shield 16 also shields the engine compartment from the fluid being splashed or sprayed. The height of the drain shield 16 can vary in height given a particular distance to an internal drain line, but preferably extends to at least the bottom of the internal drain line. One or more shield openings 20 are disposed in the drain shield 16, such that fluid on the deck can enter the top opening of funnel member 12 therethrough. The shield opening 20 can be substantially circular, extend horizontally along the bottom of the drain shield, or any other suitable shape. The flange openings of the deck flange 14 are aligned with the bottom of the shield opening 20, such that fluid can enter the funnel member via one or more deck holes unimpeded by the deck flange 14 or drain shield 16. The drain shield 16 is preferably made of a non-flammable material. The drain shield 16 can be made of metal, metal alloy, or other suitable material.

The funnel member 12, the deck flange 14, and the drain shield 16 are operably coupled to form the apparatus 10. Apparatus 10 can be formed by a single material or assembled using two or more components. The components can be coupled together using a weld, glue or epoxy, compression, riveting, or other suitable technique for adhering materials. The apparatus 10 is preferably made of a non-flammable material. The apparatus 10 can be made of metal, metal alloy, or other suitable material. Preferably, apparatus 10 is made of steel, titanium, or cres (corrosion resistant steel). However, apparatus 10 can also be made of plastic, silicon, or other suitable material.

Figure 2:
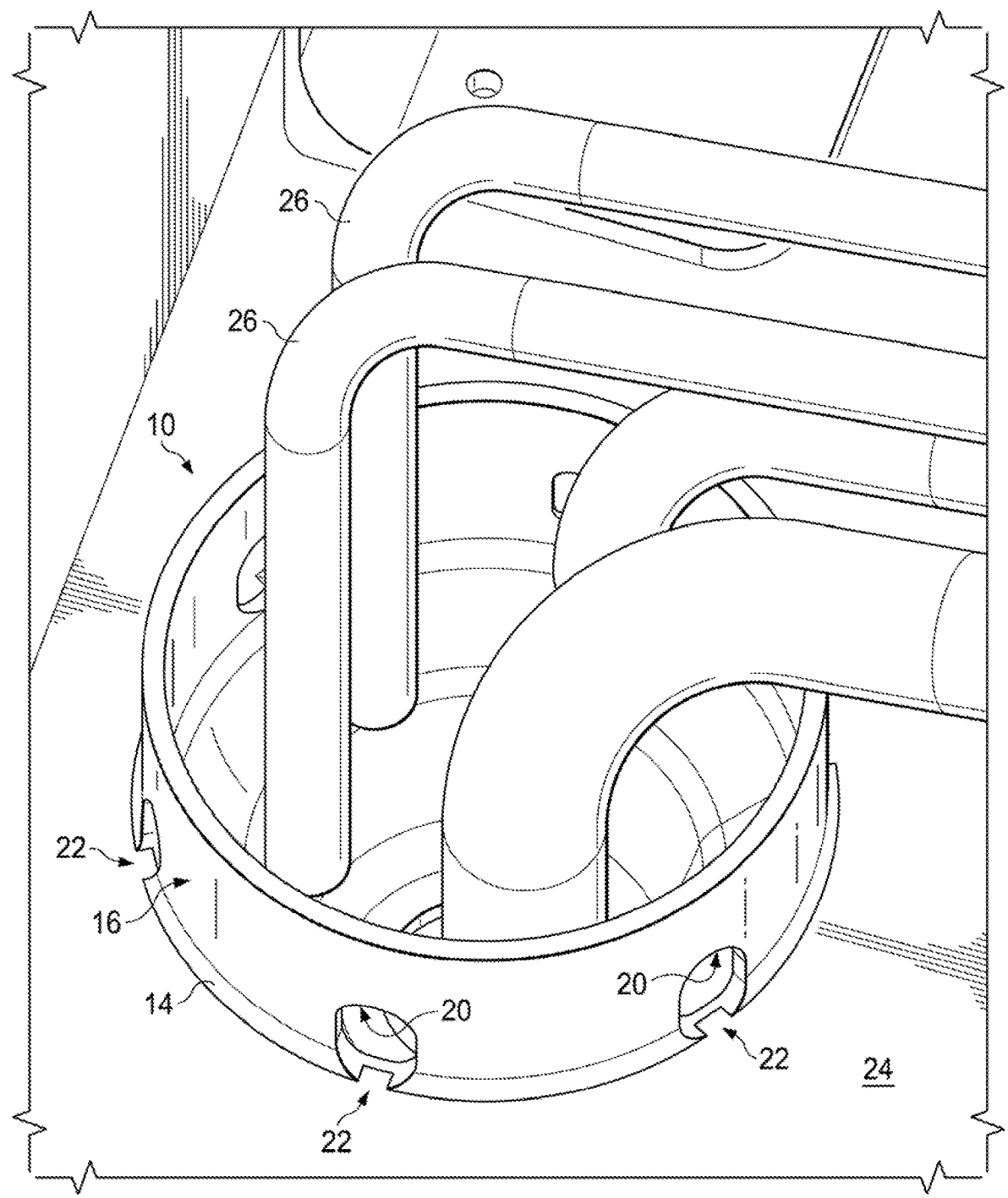
FIG. 2 is a top-perspective view of a fluid drainage system, in accordance with an embodiment of the claimed invention.

FIG. 2 is a top-perspective view of a fluid drainage system installed in an engine deck, in accordance with an embodiment of the claimed invention. In one exemplary scenario, an engine begins to malfunction during operation, causing a fluid leak. The fluid is routed away from the engine via an internal drain line 26. The egress end of the internal drain line 26 is positioned over apparatus 10 disposed in engine deck 24. The cooling airflow that enters the engine compartment to cool the engine is directed around the drain shield 16 as it comes into contact with the drain shield 16, allowing the fluid to drain from the internal drain line 26 into the apparatus 10 without interference from the airflow. The apparatus 10 then directs the fluid to an external drain line to expel the fluid from the engine compartment.

In another exemplary scenario, a fluid leak occurs in the engine compartment, such as from an oil line leaking or any other source, and falls on the engine deck 24. As the fluid moves along the engine deck, the fluid can move through the flange openings 22, the shield openings 20, and into the apparatus 10, which then directs the fluid to an external drain line to expel the fluid from the engine compartment. The flange opening 22 can be tapered.

Figure 3:
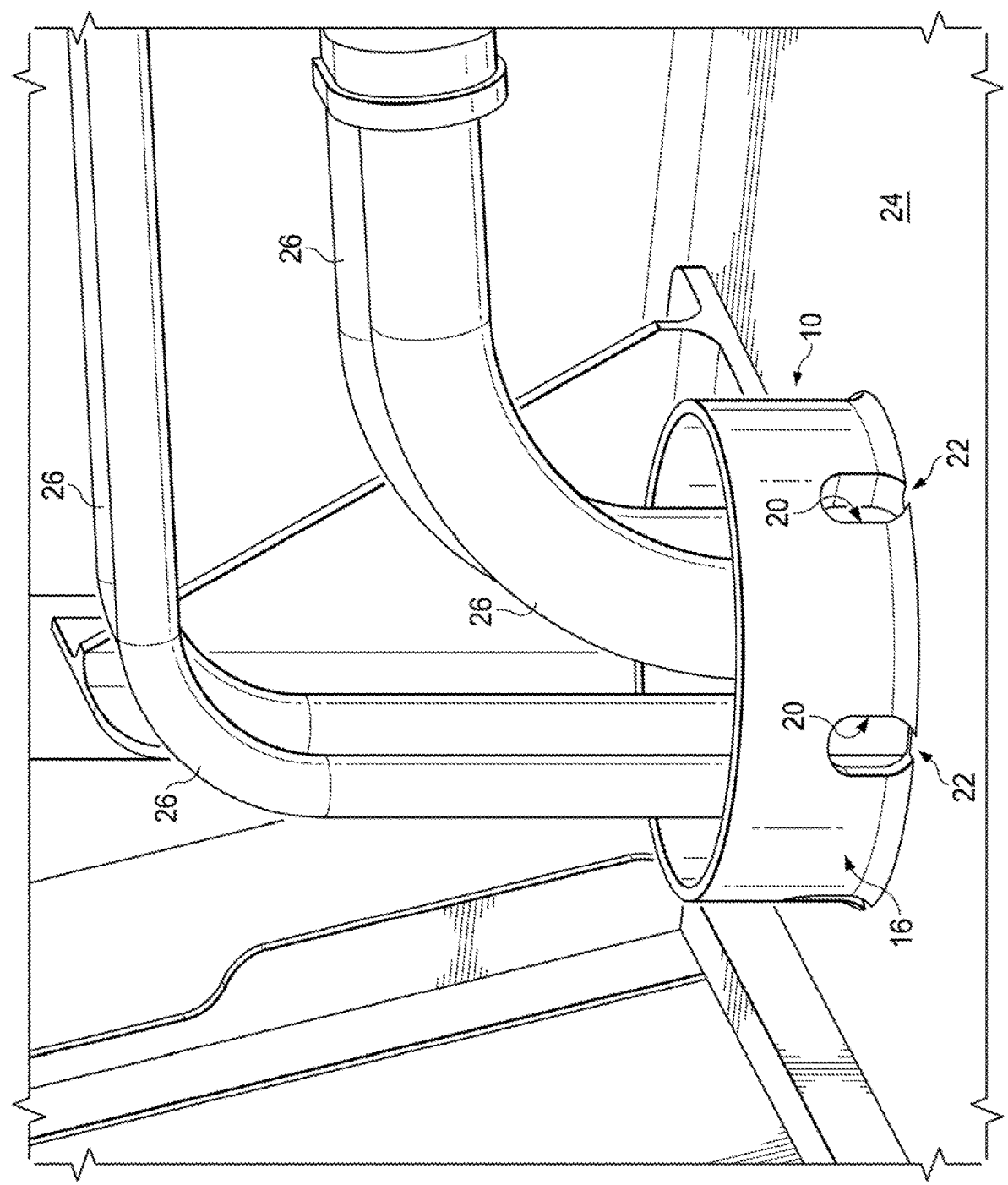
FIG. 3 is a side-perspective view of a fluid drainage system, in accordance with another embodiment of the present invention.

FIG. 3 is a side-perspective view of a fluid drainage system in accordance with an embodiment of the present invention. The fluid drainage system includes a cooling inlet, an internal drain line 26, an external drain line, and a fluid drainage apparatus 10. The cooling inlet directs airflow throughout an engine compartment having an engine deck 24. The internal drain line 26 directs a fluid toward the external drain line to expel the fluid from the engine compartment. The fluid drainage apparatus 10 includes a funnel member 12 and a drain shield 16. The funnel member 12 includes a top opening adapted to receive the fluid and a bottom opening adapted to direct the fluid to the external drain line through the bottom opening. The drain shield 16 is coupled to the funnel member 12 and extends upwardly from the funnel member 12. The drain shield 16 shields the fluid exiting the internal drain line 26 from the cooling inlet airflow. One or more shield openings 20 are disposed in the drain shield 16 such that any of the fluid on the engine deck 24 can enter the apparatus 10, which directs the fluid to an external drain line, thereby expelling the fluid from the engine compartment.

Figure 4:
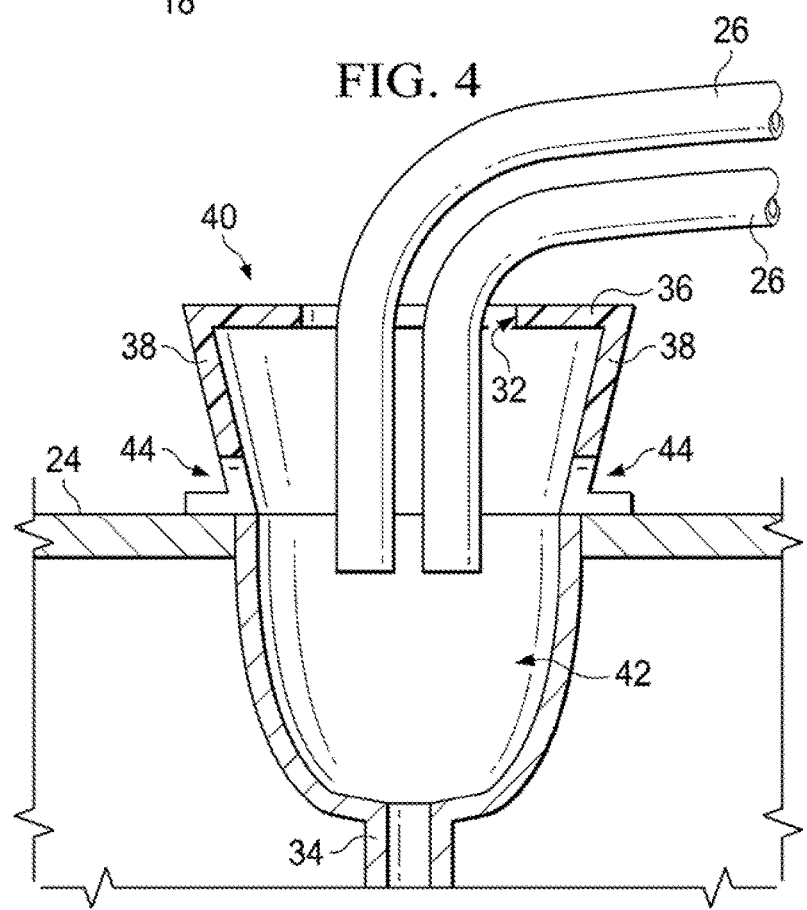
FIG. 4 is a cross-sectional view of a fluid drainage box system, in accordance with another embodiment of the present invention.

FIG. 4 is a cross-sectional view of a fluid drainage box system, in accordance with another embodiment of the present invention. Fluid drainage box 40 is an enclosed box having four side portions 38 and a top portion 36. The top portion 36 has a box opening 32 disposed in its center, such that internal drain lines 26 can extend therethrough. The box opening 32 should provide sufficient clearance around the internal drain lines 26 to avoid contact. The sides portions 38 of drainage box 40 include one or more box openings 44, which allow fluid on the engine deck 24 to flow into deck hole 42. Deck hole 42 is coupled to external drain line 34 to facilitate the removal of the fluid from the engine compartment.

Fluid drainage box 40 can be formed by a single material or assembled using two or more components. The components can be coupled together using a weld, glue or epoxy, compression, riveting, or other suitable technique for adhering materials. The fluid drainage box 40 is preferably made of a non-flammable material. The fluid drainage box 40 can be made of metal, metal alloy, or other suitable material. Preferably, fluid drainage box 40 is made of steel, titanium, or cres (corrosion resistant steel). However, apparatus 10 can also be made of plastic, silicon, or other suitable material. The fluid drainage box 40 is coupled to the engine deck via a weld, rivet, sealant or other suitable adhesive.

Figure 5A:
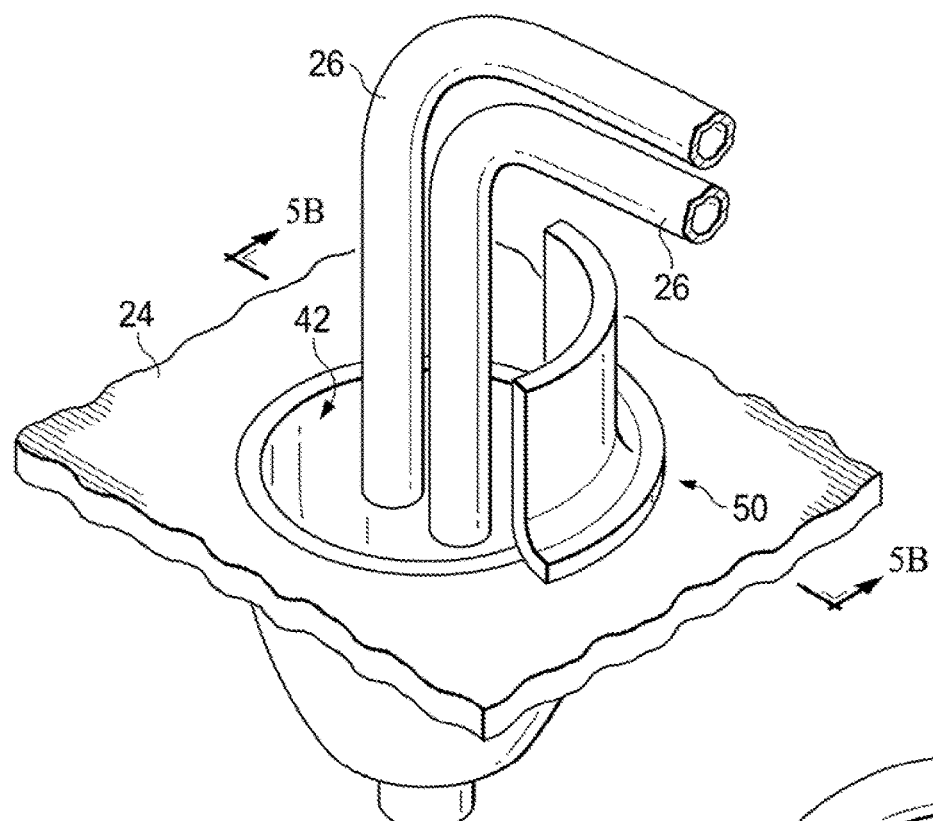
FIG. 5A is a perspective view of an airflow shield system, in accordance with another embodiment of the present invention.

FIG. 5A is a perspective view of an airflow shield system, in accordance with another embodiment of the present invention. Airflow shield 50 allows fluid on an engine deck to flow into a drain hole 42, while shielding airborne fluid exiting internal drain line 26 from airflow. The airflow shield 50 contains a shield member and a base member. The shield member extends vertically from the engine deck and preferably circumscribes half of the circumference of the drain hole 42. However, the shield member can circumscribe more or less of the drain hole 42, depending on the application. By not completely circumscribing the drain hole 42, the shield member can provide any airborne fluid exiting the internal drain line 26 some protection from the airflow, while allowing greater drainage of any fluid on the engine deck 24. The shield member also shields the drain hole 42 from the cooling inlet airflow. The airflow shield 50 also partially shields the engine compartment from the fluid splashing or spraying in a particular direction. The height of the airflow shield 50 can vary in height given a particular distance to an internal drain line 26, but preferably extends to at least the bottom of the internal drain line 26.

One or more airflow shield openings are disposed in the airflow shield 50, such that fluid on the deck can enter the drain hole 42 therethrough. The airflow shield opening can be substantially circular, extend horizontally along the bottom of the airflow shield 50, or be any other suitable shape. The base member allows the airflow shield 50 to be securely coupled to the engine deck 24. The airflow shield 50 is preferably made of a non-flammable material. The airflow shield 50 can be made of metal, metal alloy, or other suitable material.

Figure 5B:
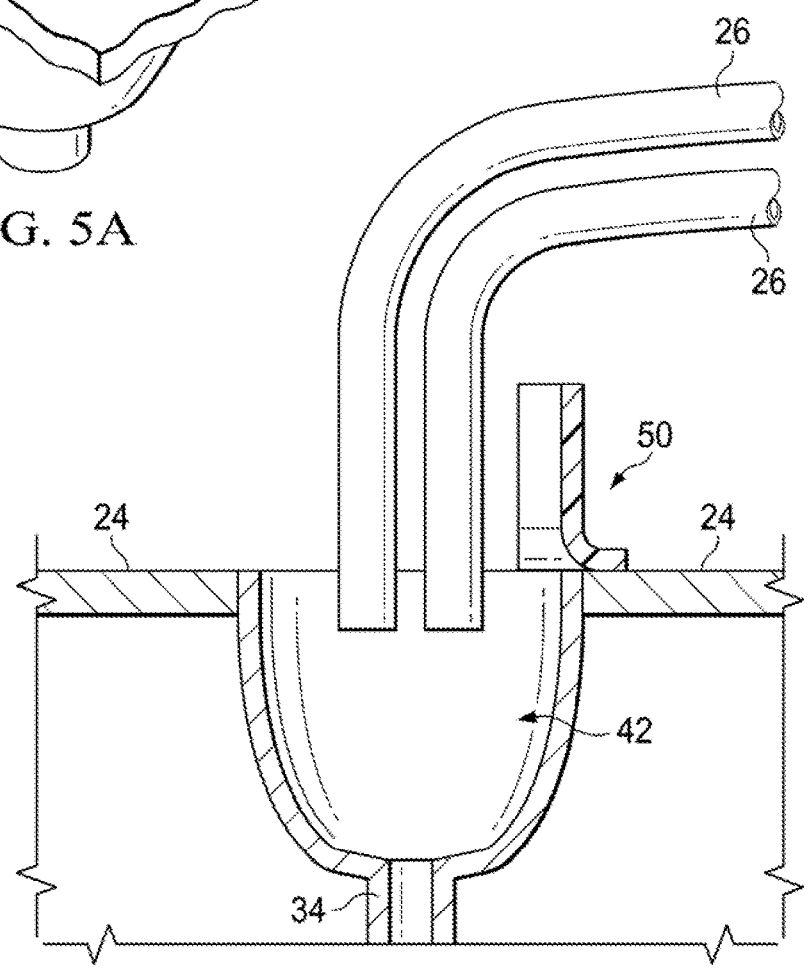
FIG. 5B is a cross-sectional view of an airflow shield system, in accordance with another embodiment of the present invention.

FIG. 5B is a cross-sectional view of an airflow shield system, in accordance with another embodiment of the present invention. In application, airflow shield 50 is positioned between the drain hole and the cooling inlet, such that airflow is directed around airflow shield 50 as the airflow comes into contact with airflow shield 50. This system configuration mitigates fluid perturbation as it exits the internal drain line 26. In another embodiment, the airflow characteristics of the engine compartment are documented to determine the direction of the maximum airflow toward the drain hole 42. In this scenario, the airflow shield 50 is placed between the drain hole 42 and the maximum airflow.

Figure 6:
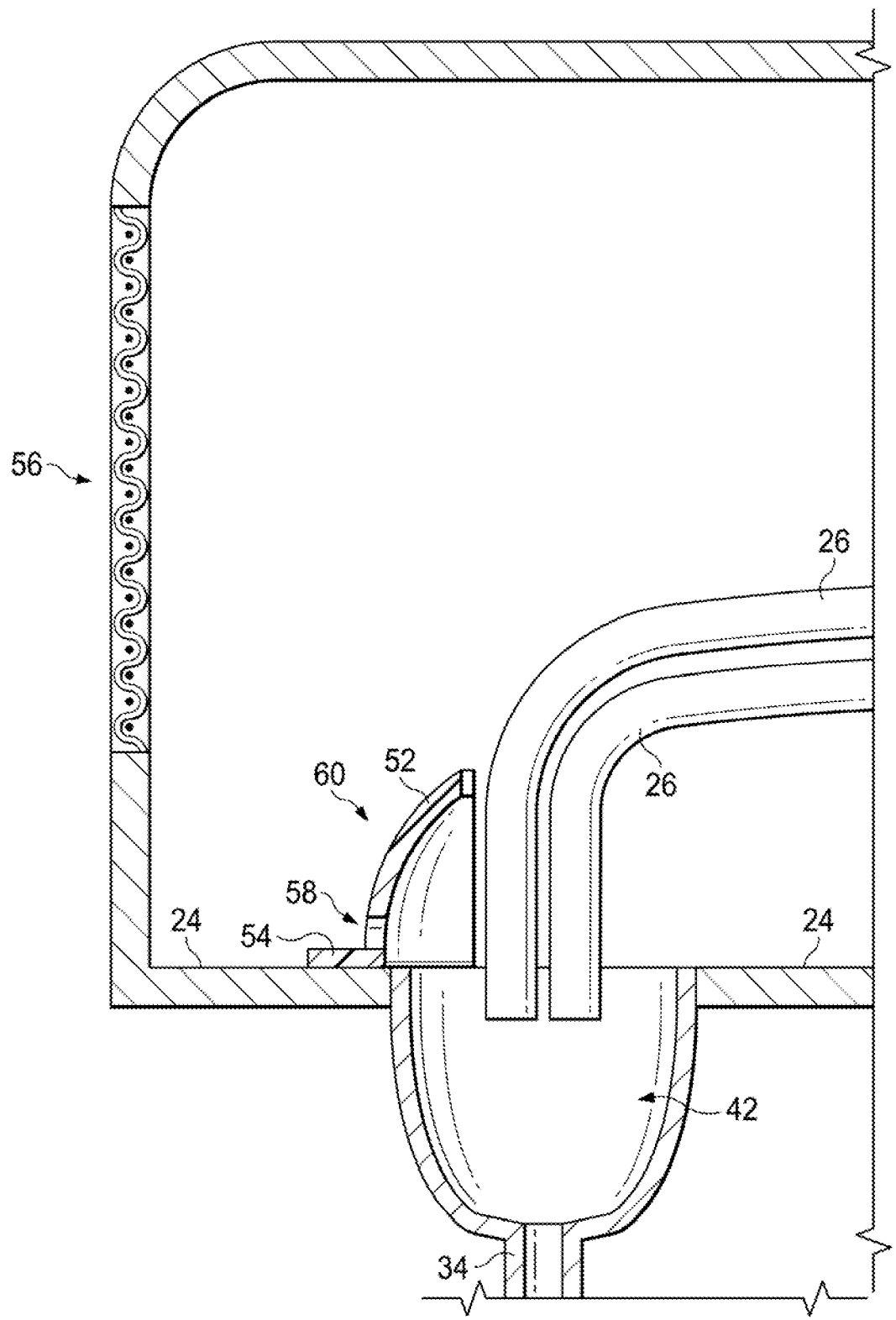
FIG. 6 is a cross-sectional view of an inlet shield system, in accordance with another embodiment of the present invention.

FIG. 6 is a cross-sectional view of an inlet shield system, in accordance with another embodiment of the present invention. The inlet shield system includes an engine compartment inlet screen 56, an internal drain line 26, an external drain line 34, a drain hole 42, and an inlet shield 60 having inlet openings 58. The cooling inlet directs cooling airflow toward an engine in an engine compartment having an engine deck 24. The engine compartment inlet screen 56 protects the engine from debris and allows the airflow to access an engine. The airflow scrubs the engine to provide a cooling effect. The external drain line 34 is coupled to a drain hole 42 and directs fluids out of the engine compartment. The internal drain line 26 drains excess fluid within the engine compartment and directs the fluid toward the drain hole 42 and external drain line 34. The inlet shield 60 includes an overhang member 52 and a base member 54. The base member 54 of the inlet shield 60 can be coupled to the engine deck. The overhang member 52 of the inlet shield 60 can be positioned to overhang an opening of the drain hole 42 to shield the fluid exiting the internal drain line 26 from the airflow from the inlet screen 56, such that the airflow is directed around the inlet shield 60 and substantially away from any airborne fluid exiting the internal drain line 26. Also, any airborne fluid directed toward the inside of the inlet shield 60 would be substantially directed toward the drain hole 42 by the inlet shield 60. A plurality of inlet openings 58 can be disposed in the inlet shield such that any fluid on the engine deck 24 can enter the drain hole 42, therethrough. The inlet shield 60 mitigates the airflow's effect on the fluid exiting the internal drain line 26 by directing the airflow away from the fluid when the airflow comes into contact with the inlet shield 60.

Figure 7:
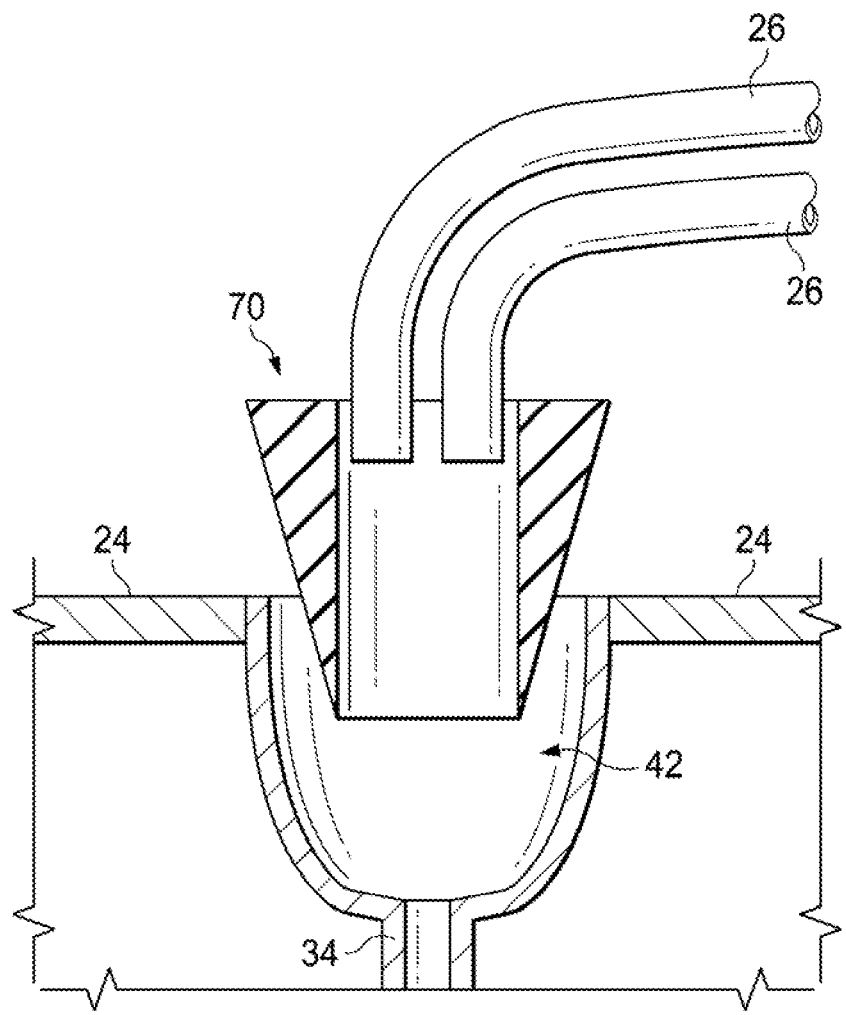
FIG. 7 is a cross-sectional view of a fluid drainage system with a grommet attached to the end of a drain line.

FIG. 7 is a cross-sectional view of a fluid drainage system with a grommet attached to the end of a drain line. A grommet 70 can be attached to the end of an internal drain line 26 to further shield the fluid exiting the internal drain line 26 from the engine compartment airflow. The grommet 70 should be sufficiently flexible to allow a drain line 26 to be inserted into an opening in the grommet 70. One or more internal drain lines can be inserted into grommet 70. The grommet 70 can be cone-shaped, wherein the smaller end does not touch the engine deck 24, to allow any fluid on the engine deck 24 to drain into the deck hole 42. In another embodiment, grommet 70 engages deck hole 42 and includes vertical grooves around the exterior of the grommet 70, such that fluid can enter the deck hole 42. The depth of the grooves can vary based upon the specific implementation. The grommet 70 can be made of plastic, silicon, or other suitable material. The grommet 70 can be used alone or in combination with the fluid drainage apparatus 10, the airflow shield 50, or the inlet shield 60. The components can be coupled together using a weld, glue or epoxy, compression, riveting, or other suitable technique for adhering materials.

Figure 8:
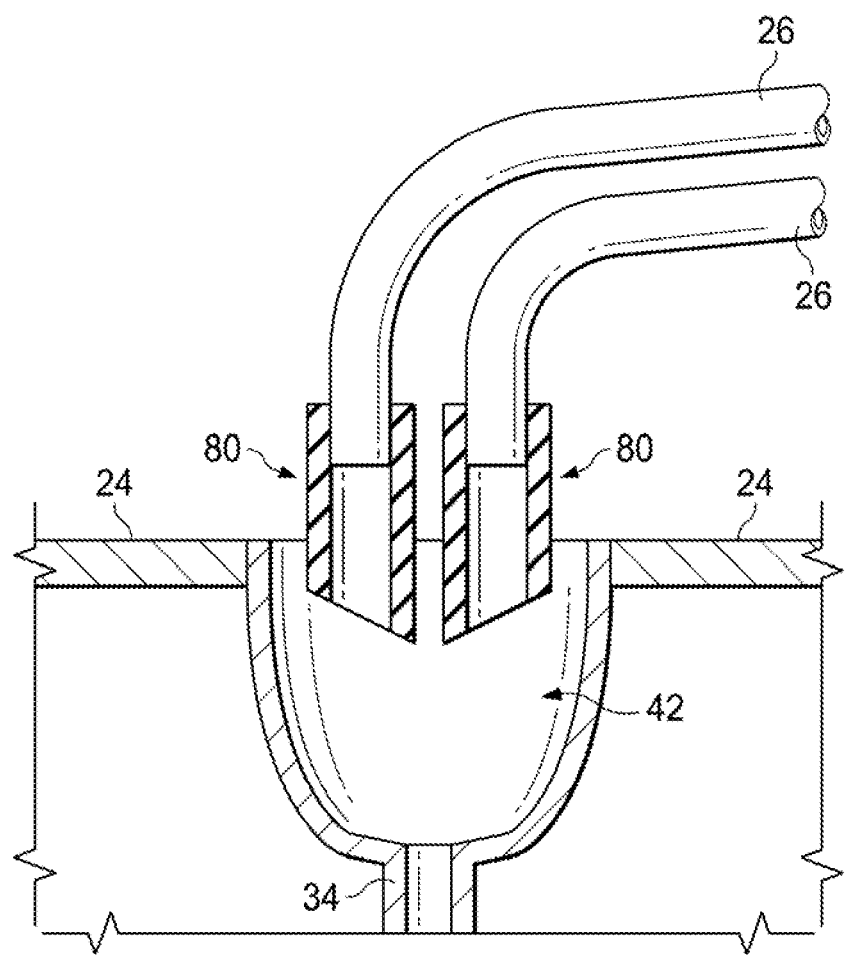
FIG. 8 is a cross-sectional view of a fluid drainage system with a flexible tube cover attached to the end of a drain line.

FIG. 8 is a cross-sectional view of a fluid drainage system with a flexible tube cover attached to the end of a drain line. A flexible tube cover 80 can be attached to an end of an internal drain line 26 to further shield the fluid exiting the internal drain line 26 from the engine compartment airflow. The tube cover 80 is preferably made of a flame-retardant material and can be cut during installation such that the bottom end of the tube cover 80 is below the engine deck 24. The tube cover 80 should be sufficiently flexible to allow an internal drain line 26 to be inserted into the tube cover 80. The tube cover 80 can be made of plastic, silicon, or other suitable material. The tube cover 80 can used alone, or in combination with the fluid drainage apparatus 10, the airflow shield 50, or the inlet shield 60. In another embodiment, the flexible tube cover 80 can be cut during installation such that the bottom end of the tube cover 80 is below the top opening of the funnel member. The components can be coupled together using a weld, glue or epoxy, compression, riveting, or other suitable technique for adhering materials.

While the present invention has been described in detail, it is not intended to be limited. Accordingly, various changes, variations, and substitutions may be made without departing with the scope of the invention as disclosed.

What is claimed is:

1. An aircraft fluid drainage configured to allow fluid on an engine deck of an aircraft engine compartment to exit the compartment, while shielding airborne aircraft fluid from airflow, comprising: a funnel member having a top opening and a bottom opening, the funnel member adapted to receive fluid in the top opening and direct the fluid to an external drain line through the bottom opening; a drain shield circumscribing the top end of the funnel member and extending only vertically therefrom, the drain shield configured to direct airflow away from the funnel member; a plurality of shield openings disposed in the drain shield such that the fluid can enter the funnel member therethrough; and a deck flange disposed substantially around the top opening of the funnel member, the deck flange having a plurality of flange openings configured so that each of the shield openings extend into one of the flange openings, such that the fluid can exit through the funnel member via the flange openings unimpeded by the deck flange.

2. The fluid drainage apparatus of claim 1, wherein the drain shield partially circumscribes the top end of the funnel member.

3. The fluid drainage apparatus of claim 1, wherein the apparatus is made of a metal.

4. The fluid drainage apparatus of claim 1, wherein the apparatus is made of a metal alloy.

5. The fluid drainage apparatus of claim 1, wherein the flange opening is tapered.

6. The fluid drainage apparatus of claim 1, wherein a top portion of the drain shield partially overhangs the top opening of the funnel member.

7. An aircraft fluid drainage system configured to allow fluid on an engine deck of an aircraft engine compartment to exit the compartment, while shielding airborne aircraft fluid from airflow, comprising: a cooling inlet adapted to direct an airflow throughout an engine compartment having an engine deck; an internal drain line for directing a fluid toward an external drain line; and a fluid drainage apparatus, comprising: a funnel member having a top opening and a bottom opening, the funnel member adapted to receive the fluid in the top opening and direct the fluid to the external drain line through the bottom opening; a drain shield coupled to the funnel member and extending only vertically therefrom, the drain shield adapted to shield the fluid from airflow; and a plurality of shield openings disposed in the drain shield such that the fluid can exit through the funnel member from the engine deck.

8. The fluid drainage system of claim 7, further comprising a deck flange disposed substantially around the top opening of the funnel member, the deck flange having a plurality of flange openings configured so that each of the shield openings extend into one of the flange openings, such that the fluid can exit through the funnel member via the flange openings unimpeded by the deck flange.

9. The fluid drainage system of claim 8, wherein the flange opening is tapered.

10. The fluid drainage system of claim 7, further comprising a rubber grommet disposed around the internal drain line.

11. The fluid drainage system of claim 7, further comprising a flexible tube cover disposed around the internal drain line.

12. The fluid drainage system of claim 11, wherein the flexible tube cover extends from the internal drain line to the top opening of the funnel member.

13. The fluid drainage system of claim 7, wherein the apparatus is made of a metal.

14. The fluid drainage system of claim 7, wherein the apparatus is made of a metal alloy.

15. The fluid drainage apparatus of claim 7, wherein the drain shield partially circumscribes the top end of the funnel member.

16. An aircraft inlet shield system configured to allow fluid on an engine deck of an aircraft engine compartment to exit the compartment, while shielding airborne aircraft fluid from airflow, comprising: a cooling inlet adapted to direct an airflow in an engine compartment having an engine deck; an engine inlet screen adapted to protect an engine from debris and allow the airflow to access the engine; an internal drain line for directing a fluid away from the engine; a drain hole coupled to an external drain line, the external drain line adapted to direct the fluid out of the engine compartment; and an inlet shield coupled to the engine deck and positioned shield the fluid exiting the internal drain line from the airflow, comprising: a funnel member having a top opening and a bottom opening, the funnel member adapted to receive the fluid in the top opening and direct the fluid to the external drain line through the bottom opening; a drain shield coupled to the funnel member and extending only vertically therefrom, the drain shield adapted to shield the fluid from airflow; and a plurality of shield openings disposed in the drain shield such that the fluid can exit through the funnel member from the engine deck.

17. The inlet shield system of claim 16, wherein the inlet shield further includes an inlet opening disposed in the inlet shield such that the fluid can enter the drain hole therethrough.

18. The inlet shield system of claim 16, further comprising a rubber grommet disposed around the internal drain line.

19. The inlet shield system of claim 16, further comprising a flexible tube cover disposed around the internal drain line.

20. The inlet shield system of claim 16, wherein the inlet shield partially circumscribes the drain hole.

* * * * *